(12) United States Patent
Wolstenholme (10) Patent No.: US 8,459,527 B2
(45) Date of Patent: Jun. 11, 2013

(54) APPARATUS FOR ENSURING CONCENTRIC WELD DEPOSITION OF MATERIAL ON A PIPE INTERIOR

(75) Inventor: Derek J. Wolstenholme, Calgary (CA)

(73) Assignee: Indutech Canada LP, Calgary (CA)

( * ) Notice: Subject to any disclaimer, the term of this patent is extended or adjusted under 35 U.S.C. 154(b) by 0 days.

(21) Appl. No.: 12/881,877

(22) Filed: Sep. 14, 2010

(65) Prior Publication Data

US 2012/0061452 A1    Mar. 15, 2012

(51) Int. Cl.
*B23K 31/00*    (2006.01)
*B23K 37/04*    (2006.01)

(52) U.S. Cl.
USPC ............. 228/44.3; 228/44.5; 228/46; 269/47; 269/50; 269/52

(58) Field of Classification Search
USPC ................. 228/44.3, 44.5, 46; 269/47, 50, 52
See application file for complete search history.

(56) References Cited

U.S. PATENT DOCUMENTS

| 2,221,187 | A | * | 11/1940 | Gunn et al. | 219/86.9 |
|---|---|---|---|---|---|
| 2,768,597 | A | * | 10/1956 | Smith | 228/6.1 |
| 2,804,836 | A | * | 9/1957 | Tiedemann | 269/48.1 |
| 3,031,995 | A | * | 5/1962 | Taylor, Jr. | 269/48.1 |
| 3,110,277 | A | * | 11/1963 | Dixon et al. | 228/46 |
| 4,387,845 | A | * | 6/1983 | Mefferd | 228/222 |
| 4,850,524 | A | * | 7/1989 | Schick | 228/102 |
| 5,942,289 | A | * | 8/1999 | Jackson | 427/398.2 |
| 2008/0048010 | A1 | * | 2/2008 | Brousset et al. | 228/212 |

\* cited by examiner

*Primary Examiner* — Devang R Patel
(74) *Attorney, Agent, or Firm* — D. Doak Horne (57) ABSTRACT

A welding jig for ensuring concentricity of an interior surface of a pipe with a circular outer periphery of a bolting flange thereon, comprising (i) a frame member; (ii) two spaced-apart rollers positioned at one end of said frame member, each adapted to remain in contacting engagement during welding with said circular outer periphery of said bolting flange; and (iii) a chill block, having a convexly-curved outer surface of a curvature corresponding to a desired inner diameter of said pipe, adapted to be positioned proximate said interior surface of said pipe. The rollers permit translational movement of the chill block about a center point of said pipe flange when the welding jig is placed on the pipe flange, to permit uniform diametrical deposition of weld material on said inner diameter of said pipe flange. A method of making a pipe is further disclosed and claimed.

10 Claims, 6 Drawing Sheets

APPARATUS FOR ENSURING CONCENTRIC WELD DEPOSITION OF MATERIAL ON A PIPE INTERIOR

FIELD OF THE INVENTION

The invention relates to a welding jig apparatus for ensuring uniform concentric deposition of material to the interior of a pipe, and a method for ensuring concentric deposition of material on the pipe's interior.

BACKGROUND OF THE INVENTION AND DESCRIPTION OF THE PRIOR ART

Hydropumping of hydrocarbon slurries over large distances is often carried out by pumping such slurries through large diameter (often 36 inch/0.3 m or greater) pipe segments which make up an "oil" pipeline.

Due to the highly-abrasive nature of some of the slurries (such as bitumen when recovered from a tar sands recovery facility and which typically contains a substantial amount of abrasive sand), frequently elongate narrow-diameter (ie 0.25 in/0.63 cm) abrasion-resistant chromium carbide rods (alternatively called "wires") are welded to the interior of each pipe segment making up a pipeline, with a multitude of such carbide rods extending longitudinally the length of the pipe and radially juxtaposed about the entire circumference of the interior of each pipe segment to thereby cover the entirety of the inner periphery of each pipe segment and thereby increase the wear resistance of the interior of each mild-steel pipe segment to abrasion. Alternatively, such wires may be circumferentially wound around the inner periphery of the pipe.

Pipes having the above chromium-carbide rods have been found to have increased abrasion resistance between 4 to 14 times as compared to the lifespan of ordinary mild steel pipe which lack chromium carbide rod overlays.

The applicant Indutech Canada Ltd., using various specially-adapted equipment and techniques, has for many years manufactured and supplied abrasive-resistant piping having such chromium carbide rod overlays welded to the interior of pipe segments, where such pipe segments are to be used in hyrdopumping of slurries of crude oil and bitumen and where such slurries are abrasive in nature.

Problematically, however, chromium carbide rods typically have a substantially different co-efficient of thermal expansion than the outer steel pipe. Accordingly, during welding of the inner chromium carbide rods to the interior of the steel pipe and also when a mating flange is welded to the pipe, the pipe inner diameter becomes non-concentric and distorted (out of round). Moreover, due to the rod-like nature of the rods when welded to the interior of the pipe, discontinues due to the non-uniform nature of the rods exists.

This distortion and discontinuities between pipe segments is extremely undesirable, since when bolting a pipe-flange assembly of one pipe segment to another similar pipe flange assembly of another pipe segment in order to form a continuous pipeline, any distortion in the circular contour of the inner pipe diameter at its mating edge with another flange assembly results in discontinuities in the interior surface of the pipe. Such discontinuities undesirably cause turbulence in the flow of the slurry within the pipe. Accordingly, when abrasive slurries are pumped through the pipe, undesirable and increased wear on the interior of the pipe occurs at the areas of non-concentricity. This results in greatly increased friction and wear at the points of discontinuity.

In addition to the detrimental effect on pipe wear life due to increased wear, discontinuities in the pipe connections undesirably cause turbulence, which reduces the extent to which there is laminar flow of fluid in the pipeline. Laminar flow in the pipeline (as opposed to turbulent flow) is greatly desired, as laminar flow results not only in less wear within the pipeline, but decreases the pumping pressure necessary to pump a hydrocarbon slurry over a given distance. Accordingly, discontinuities in the interior pipe diameters at the point of coupling of one pipe section to another results in higher pump pressures (and larger pumps) necessary than would otherwise be the case if laminar flow was achieved to a greater degree in the pipeline.

In order to attempt to reduce the above problems, pipeline companies when purchasing abrasive-resistant piping frequently specify that the concentricity and diameter of each mating flange be within certain strict tolerances, in order to reduce or eliminate to the extent possible the above undesirable conditions.

Accordingly, to meet the strict tolerances and concentricity requirements of the pipe segment flanges and to thereby avoid the undesirable occurrence of discontinuities in the slurry flow from one pipe segment to another, skilled welders are required to "build up" the inner circular diameter of each pipe segment proximate each flange member to a greater degree than necessary (ie with an excess carbide rods or weld material), and then grind down the "high" areas of the "overlay" to make the interior of the pipe flange of a fixed diameter and perfectly circular and concentric, so that when a similar flange is bolted to it there is a smooth transition at the point of abutment of the two pipe segments, and no turbulent flow is created.

Unfortunately, however, "building up" the inner area in such manner and then grinding out the "high" spots to obtain a perfectly circular and concentric inner pipe requires great skill, but even more problematically, is difficult to do and extremely time consuming and thus introduces considerable expense to the cost of manufacture of wear and abrasion-resistant pipe.

Accordingly, a real need exists in the art of manufacture of abrasion-resistant pipe for an apparatus and method to more rapidly (and in a less labour-intensive and costly manner) produce abrasive-resistant pipe wherein the inner diameter (at least in the region of the mating flange) is concentric with and in a substantially uniform fixed diametric relation with the circular outer periphery and/or bolt hole pattern on the associated flange member, in order to reduce or eliminate discontinuities in the interior of the resulting pipeline formed by the joining of various abrasion-resistant pipe segments.

U.S. Pat. No. 4,850,524 entitled "VERTICAL STRIP CLAD WELDING METHOD AND APPARATUS" teaches a method and apparatus for welding vertical strip clad overlays into interiors of cylindrical vessels. Insofar as is potentially relevant, such apparatus teaches, at col 3, lines 54-60, a welding shoe 70 which comprises a shoe mold 72 and a shoe insert 74. The should mold 72 is preferably of copper, and has cooling passage 75 therein to permit cooling of the welding shoe. Notably, however, the purpose of the device disclosed in U.S. Pat. No. 4,850,524 is to weld strip cladding, and there is no disclosure nor provision on the weld apparatus to situate itself concentrically to a flange bolt pattern or circular outer periphery of a flange for the purpose of ensuring concentricity of the inner diameter of the cylinder with a bolt flange pattern.

US Publication 2008/0048010 entitled "CLADING COMPLEX PIPING GEOMETRY" teaches a mounting fixture for weld equipment used in weld overly operations on nozzles of a nuclear power generator pressurizer. The mounting fixture has a first ring which is adapted to be located around pressurizer pipe, having such mounting assemblies thereon for mounting to studs welded to a surface of the pressurizer, and a second region spaced from the first ring, having a series of jacking assemblies which can be positioned against the pipe nozzle, and a series of support legs (item 46, FIGS. 3&4) connecting the first and second ring.

U.S. Pat. No. 6,953,142 entitled "METHOD AND APPARATUS FOR HOLDING A FLANGE" discloses an apparatus for locating and grasping a flange, having a number of clamp arms. Importantly, a number of pins are adapted to move upwardly into flange holes within the flange for positioning the flange during the clamping action. Accordingly, the mounting fixture of U.S. Pat. No. 6,953,142 is not for mounting on the interior of a flanged pipe to ensure uniform concentric deposition of weld material around the interior of a pipe, and thus this patent likewise is only of background interest.

U.S. Pat. No. 4,496,097 entitled "AUTOMATIC BELLOWS WELDER AND METHOD FOR USING SAME", as shown in FIGS. 3 & 4 thereof and as described at col. 3, lines 11-35, relates to a welding apparatus for welding two circular plate members along a concentric annulus thereof to form a "convolution". A pair of planar spaced-apart weld spools 22, and a pressure roller 20 are provided, each arranged in a triangular configuration While the pressure roller 20 forces the diaphragms against the weld spools 22 and ultimately against each other to permit welding. While such is somewhat analogous to the present invention as set out below which uses a pair of rollers on the outside of the flange and the chill block as the effective pressure roller 20, notably, as expressly stated at col. 4, lines 35-40, such device "does not provide for chill . . . [as] it has been found that by this method of fixturing . . . chill can be eliminated." Moreover, such patent does not teach the spacing of any chill block a spaced distance to allow deposition of weld material, but merely welds two flange type members together to form a bellows.

U.S. Pat. No. 5,942,289 entitled "HARDFACING A SURFACE UTILIZING A METHOD AND APPARATUS HAVING A CHILL BLOCK", as may perhaps be most clearly seen from FIGS. 2 & 3 thereof, relates to a method and apparatus for deposition of a hardfacing material 60 on a curved (see surface 42 below) surface (see surface 42). A chill block 50, which has a radius approximately equal to (but greater) than the curved surface on the workpiece upon which metal is to be deposited, is provided. The deposition head 48 and chill block 50 in a preferred embodiment are supported together in fixed relation to each other and to the workpiece. The pipe 40 is rotated about its cylindrical axis, and molten material is deposited on the exterior of the pipe 40. Notably, however, there is no triangular "fixation" of the chill block, on the interior of the pipe so as to maintain concentricity with an exterior flange, since the exterior of the pipe receives the deposition.

Lastly, U.S. Pat. No. 6,711,804 entitled "MACHINING CENTER" teaches a machine center, having at least one work spidle unit which is mounted to orbit a central axis. The spindle can be positioned in a plurality of positions around the central axis, and may be moved in the radial direction relative to the central axis. The purpose of the radial mobility of the work spindle unit is to permit location of tools along various partial central path segments, for contact with the workpiece. Such patent does not teach an apparatus having exterior rollers (for positioning on the exterior flange of a pipe), nor an interior chill block which has a spring to bias it (against the interior of the pipe and thus concentrically within the pipe).

Accordingly, and despite the above prior art, a real need continues to exist in the art of manufacture of abrasion-resistant pipe for an apparatus and method to more rapidly (and in a less labour-intensive and costly manner) produce abrasive-resistant pipe wherein the inner diameter (at least in the region of the mating flange) is concentric with and in a fixed uniform diametric relation with the circular outer periphery and/or circular bolt hole pattern on the associated flange member, in order to reduce or eliminate discontinuities in the interior of the resulting pipeline formed by the joinder of various abrasion-resistant pipe segments.

SUMMARY OF THE INVENTION

In order to overcome the problem of flanged pipes (and in particular abrasion resistant pipes having chromium carbide wear rods welded to the interior of such pipes) having non-concentric interior diameters, and to more quickly and economically produce pipe members having interior diameters which are concentric with the circular outer periphery of the bolting flange and/or the circular bolt hole pattern therein, the present invention provides for a welding jig of a specific construction, and a method of manufacture of pipe members.

Broadly speaking, the invention comprises in one aspect a welding jig, which is adapted to overlie a planar face of a bolting flange on a pipe. The welding jig inter alia comprises (i) a frame member; (ii) two spaced-apart contact members positioned at one end of said frame member, each adapted to remain in contacting engagement during welding with either said circular outer periphery of said bolting flange or two spaced-apart bolt holes in a circular bolt hole pattern in such flange member; and (iii) a chill block.

The welding jig and associated chill block are adapted for use in welding material over a portion of the inner peripheral surface of the pipe, making such portion substantially concentric and in a fixed diametric relation to the bolt hole pattern and/or circular outer periphery of the flange. A convexly-curved outer surface is provided on the chill block, of a curvature corresponding to a desired inner diameter of said pipe. Such outer surface on the chill block, and the chill block itself, are positioned (by the frame of the welding jig) proximate the interior surface of the pipe. After welded deposition of material over the incremental portion (inner surface) of the pipe/flange, rotational movement of the chill block and welding jig about a center point of said pipe flange permit uniform diametrical deposition of weld material on the entire inner diameter of the pipe flange.

Specifically, the welding jig is adapted to be incrementally repositioned to allow rendering another portion of the inner surface substantially concentric with the bolt hole pattern or circular outer periphery of the flange. The process is repeated until the entirety of the inner periphery of the pipe/flange is rendered concentric and in a fixed uniform diametric relation to either the bolt hole pattern or the circular outer periphery of the flange.

Accordingly, in a first broad embodiment, the invention comprises a welding jig apparatus for ensuring concentricity of an interior surface of a cylindrical pipe with either (i) a circular outer periphery of a bolting flange, or (ii) a circular bolt hole pattern in said bolting flange; the welding jig comprising:

(a) a frame member, adapted to overlie a substantially planar face of said bolting flange, in a position substantially perpendicular to a longitudinal axis of said pipe, said frame member comprising:
  (i) at least two spaced-apart contact points, positioned at one end of said frame member, each adapted to contact and remain in contacting engagement during welding with said circular outer periphery of said bolting flange or said bolt hole pattern on said bolting flange;

(b) a chill block, situated substantially intermediate said contact points but spaced therefrom, adapted to receive therewithin a circulating fluid for the purpose of cooling said block member, comprising:

(i) a convexly-curved outer surface, having a curvature corresponding to a desired inner diameter of said pipe, adapted to be positioned proximate said interior surface of said pipe when said frame member overlies said bolting flange;

wherein said frame member and said contact points thereon maintain said curved outer surface of said chill block concentric with said circular outer periphery of said bolting flange and/or said bolt hole pattern during welding of material on said inner surface of said pipe.

In another broad aspect of the present invention such invention comprises a welding jig for ensuring concentric weld deposition of material on an interior diameter of a pipe flange, comprising:

frame means, adapted to be positioned over a planar bolting face of said pipe flange;

at least two spaced-apart contact points, positioned at one end of said frame member, each adapted to contact and remain in contacting engagement during welding with said circular outer periphery of said bolting flange on said pipe;

a chill block, mounted on said frame means a spaced distance from said contact points, having a convexly curved outer surface of a curvature corresponding to a curvature of an inner diameter of said pipe flange;

wherein said frame means and contact points means allow translational movement of said chill block about a center point of said pipe flange to permit uniform diametrical deposition of weld material on said inner diameter of said pipe flange around an entire inner periphery of said pipe flange.

In a preferred embodiment of the welding jig of the present invention, the contact points each respectively comprise roller means, and said rollers means contact said circular outer periphery of said bolting flange and permit translational movement of said welding jig about said circular outer periphery of said bolting flange.

In yet a further preferred embodiment, the frame member of the welding jig, at a distal end thereof opposite said contact points, possesses means to permit said distal end to overlie and be supported by said bolting flange. Such means preferably comprise a pair of spaced-apart rollers, which further assist in the translational movement of the welding jig about the circular periphery of the flange and about a center of the pipe/flange.

In a further broad aspect of the present invention, such invention comprises a method for using a welding jig of the above design in manufacturing pipe with an inner diameter concentric with either the circular outer periphery of the bolting flange, or with a circular bolt hole pattern on the bolting flange.

Accordingly, in another broad embodiment, the invention relates to a method of manufacture of a pipe having a bolting flange at one end thereof, wherein an interior diameter of said pipe is formed so as to be concentric with and in a fixed diametric relation to a circular outer diameter of said bolting flange or a circular bolt hole pattern in said bolting flange, comprising the steps of:

(A) placing a welding jig, having:

(a) a frame member, adapted to overlie a face of said bolting flange, in a position substantially perpendicular to a longitudinal axis of said pipe, said frame member comprising:

(i) at least two spaced-apart contact points, positioned at one end of said frame member, each adapted to contact and remain in contacting engagement during welding with said circular outer periphery of said bolting flange or with a corresponding number of bolt holes arranged on said bolting flange;

(b) a chill block, situated substantially intermediate said contact points but spaced therefrom, adapted to receive therewithin a circulating fluid for the purpose of cooling said block member during welding, comprising:

(i) a convexly-curved outer surface, having a curvature corresponding to a desired inner diameter of said pipe, adapted to be positioned proximate said interior surface of said pipe when said frame member overlies said bolting flange;

over said bolting flange so that said contact points engage either (1) said circular outer periphery of said bolting flange; or (2) a corresponding number of bolt holes in a circular bolt hole pattern on said bolting flange, so as to maintain said curved outer surface of said chill block concentric with said circular outer periphery of said bolting flange or a bolt hole pattern thereof and a fixed distance therefrom;

(B) welding a material, intermediate said chill block and said inner surface, to said inner surface; and (C) repositioning said chill block to a new position along said interior surface of said pipe by moving said frame and contact points an incremental distance along said outer periphery of said bolting flange or along said bolt hole pattern on said bolting flange; and (D) repeating steps (B) and (C) until weld material has been deposited along an entire inner peripheral length of said inner surface.

In a refinement of the above method of the present invention, the two contact points on the welding jig comprise a pair of rollers, adapted to engage and remain in contacting engagement with an outer circular periphery of said bolting flange, and step (C) comprises the step of repositioning the chill block to a new position along said interior surface of said pipe by translational movement of said rollers, frame, and chill block about a center point of the pipe flange by rolling said rollers about said circular outer periphery of said bolting flange to a new position.

BRIEF DESCRIPTION OF THE DRAWINGS

Further advantages and permutations and combinations of the invention will now appear from the above and from the following detailed description of the various particular embodiments of the invention taken together with the accompanying drawings, each of which are intended to be non-limiting, in which.

DETAILED DESCRIPTION OF PREFERRED EMBODIMENTS

Reference numerals in each of FIGS. 1-6 designate the identical components.

Figure 1:
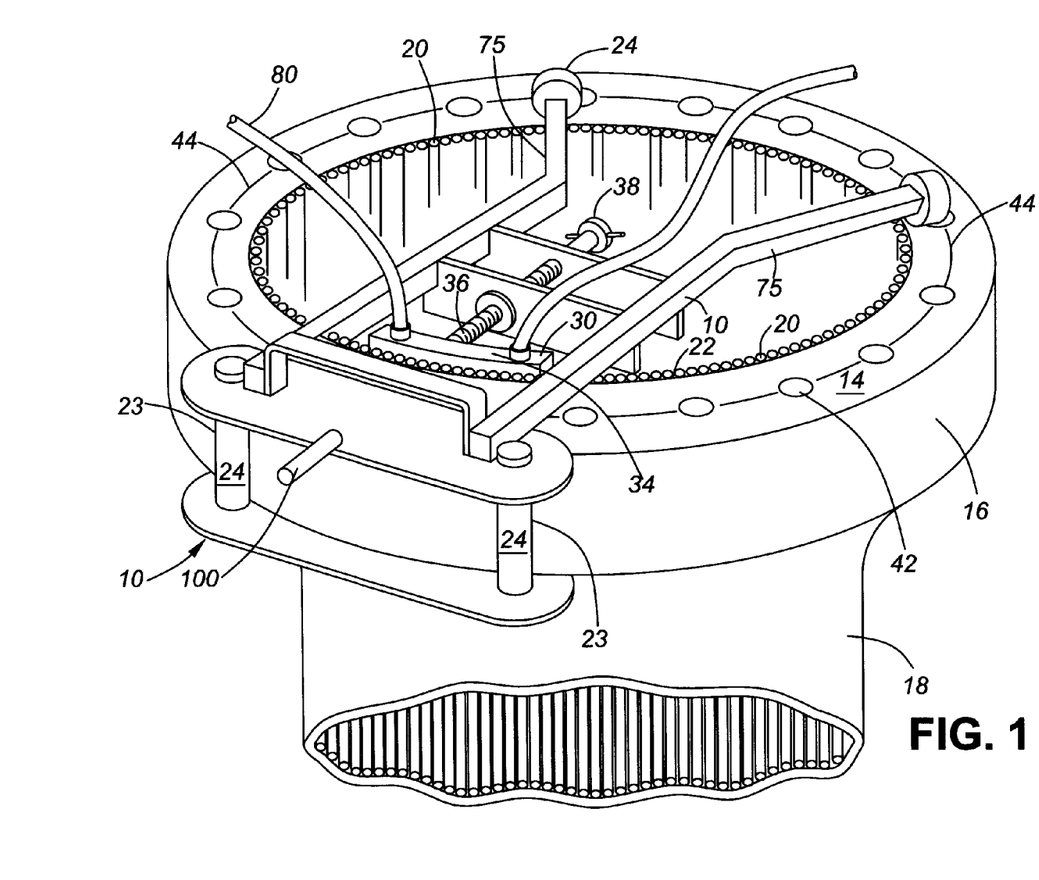
FIG. 1 is a perspective view of a first embodiment of the welding jig of the present invention, having a pair of rollers adapted for translational movement along the circular outer periphery of the bolting flange of a pipe, wherein the welding jig is positioned at a first position on the planar face of a pipe bolting flange, with the pipe having longitudinally arranged chromium-carbide rods welded to the interior of such pipe.

FIG. 1 shows a first embodiment of the welding jig 10 of the present invention, comprising a frame member 12 (which itself is substantially planar and adapted to overlie a substantially planar face 14 of a bolting flange 16 of a pipe 18). Welding jig 10, when used for the purposes disclosed herein, is disposed on said bolting flange 16 substantially perpendicular to a longitudinal axis 17 of pipe 18.

Figure 2:
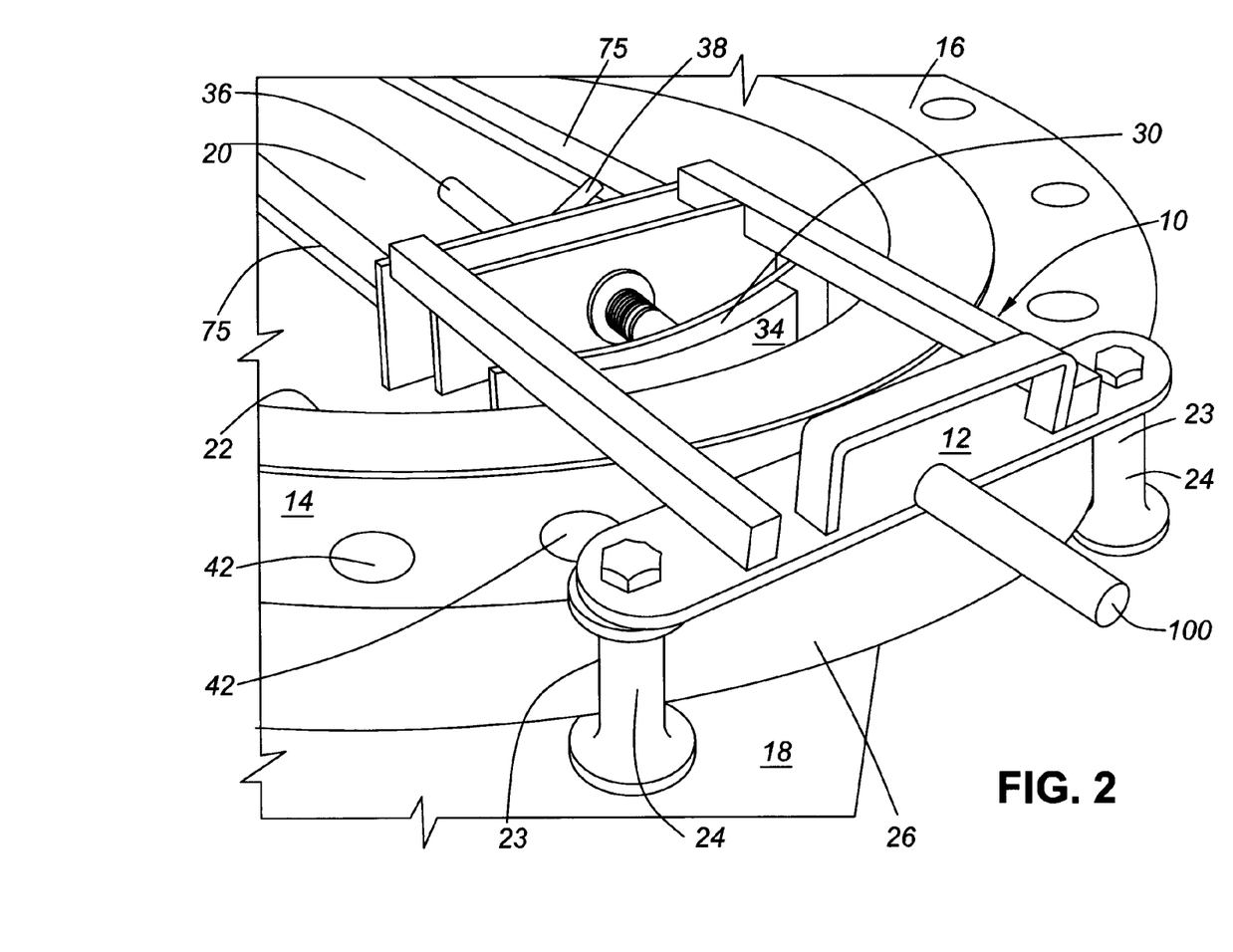
FIG. 2 is a similar (partial (perspective view of the first embodiment of the welding jig of the present invention shown in FIG. 1, repositioned on the planar face of a pipe bolting flange to a second position in order to show the manner of repositioning said welding jig, wherein the pipe in the drawing shown has a plurality of circumferentially-wound chromium-carbine rods.
Figure 3:
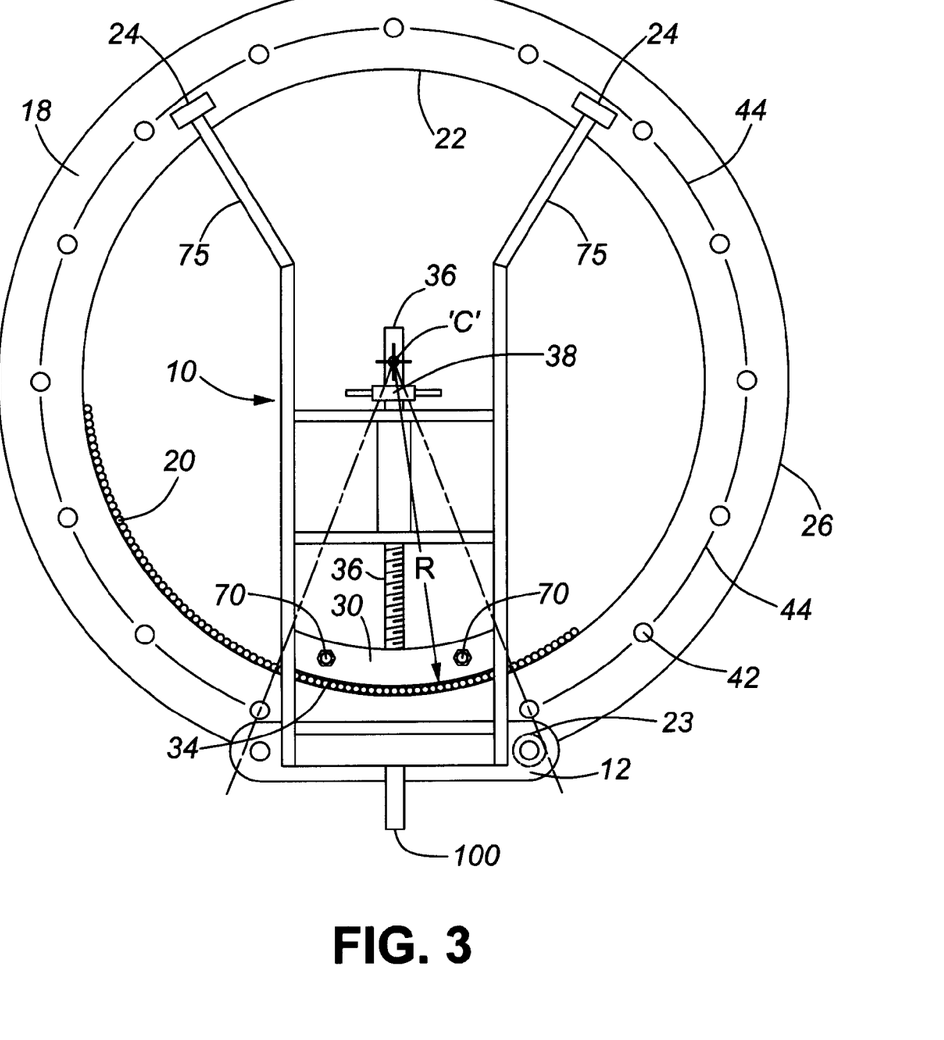
FIG. 3. is a top view of the first embodiment of the welding jig of the present invention shown in FIG. 1.
Figure 6:
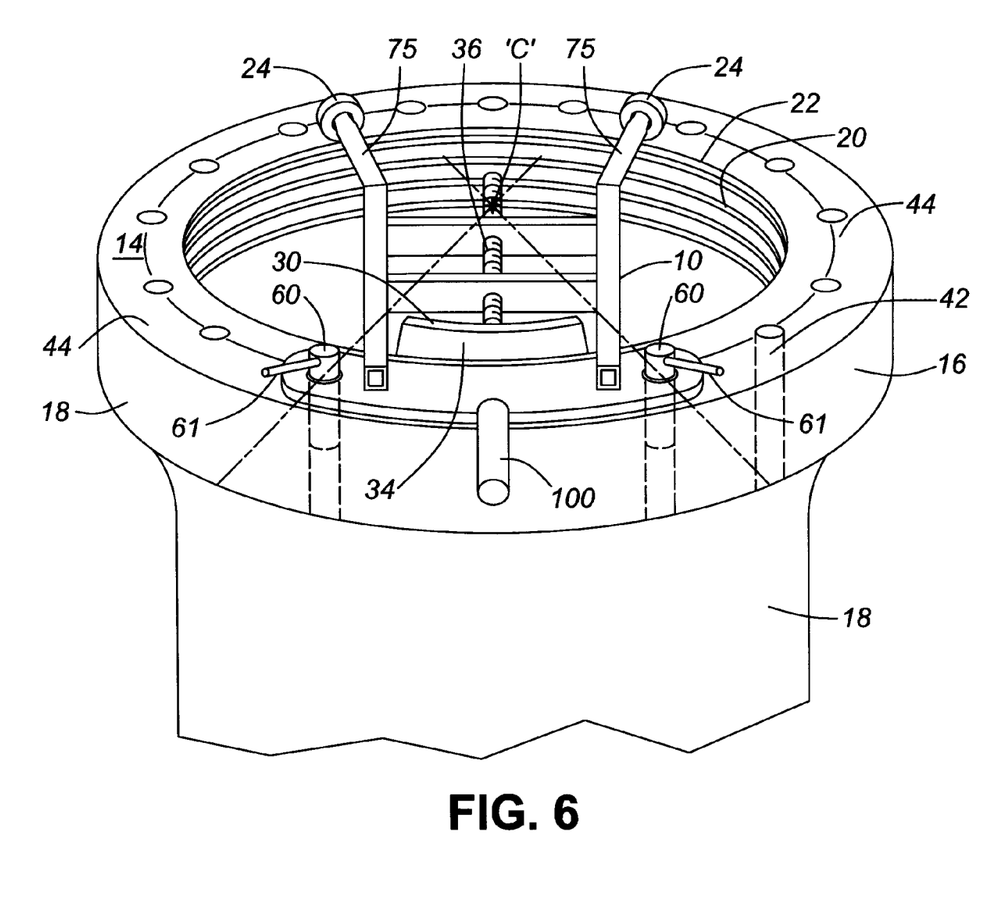
FIG. 6 is a side perspective view of the second embodiment of the welding jig of the present invention shown in FIG. 5.

Pipe 18 typically is (although it need not necessarily be) an abrasion-resistant pipe, having a plurality of chromium-carbide wear-resistant rods 20 welded longitudinally along the interior surface 22 of the pipe 18 as shown in FIGS. 1 & 3, or alternatively having a plurality of circumferentially wound chromium carbide wear-resistant rods 20 welded to the circumference of the interior surface 22 of pipe 18, as shown in FIGS. 2 & 6.

Bolting flange 16 of pipe 18 typically possesses a planar surface 40, and has a circular outer periphery 26. A plurality of bolt holes 42 are provided within a circular bolt hole pattern 44 on bolting flange 18, which are used for bolting two mating bolting flanges together to form a continuous pipe. At least one or both of the circular outer periphery 26 or the circular bolt hole pattern 44 are perfectly concentric about center point "C" of bolting flange 16 and pipe 18.

Two spaced-apart contact points 23 on welding jig. 10 in the form of two spaced-apart rollers 24 are provided at one end of frame member 12 in the first embodiment of the welding jig 10 shown in FIGS. 1-4. Rollers 24 in the embodiment shown in FIGS. 1-4 are each adapted to contact (and remain in contacting engagement during welding) with circular outer periphery 26 of bolting flange 16. Circular outer periphery 26 in the embodiment shown in FIGS. 1-4 is perfectly concentric about center "C" of pipe 18.

Welding jig 10 further comprises a chill block 30, which as best shown in FIG. 3 is situated substantially intermediate said two contact points in the form of rollers 24 on welding jig 10. Chill block 30 is typically comprised of a highly thermally conductive metal, such as copper, and is adapted to be supplied via tubing 80 with cooling fluid. Specifically chill block 30 is adapted to allow cooling fluid to be provided to it for the purpose of circulating within it to cool chill block 30 during welding, and provision is further made for connection to additional tubing 81 to permit removal of such cooling fluid from chill block 30. For this purpose fluid inlet and outlet couplings, in the form of standard fluid coupling nipples 70, are provided on chill block 30, and are typically threadably inserted into chill block 30 to allow inlet tubing 80 and outlet tubing 81 to be respectively connected thereto to supply cooling fluid during welding.

Chill block 30 possesses a convexly-curved outer surface 34, having a curvature corresponding to a desired inner diameter (2× dimension 'R') of pipe 18 (see FIG. 3). Convexly-curved outer surface 34 is positioned by frame member 12 of welding jig 10 proximate the interior surface of pipe 18, as shown in each of FIGS. 1-6.

Convexly-curved outer surface 34 of chill block 30 is held at a desired diameter of the interior of pipe 18 by an elongate threaded member 36. Elongate threaded member 36 can be turned via turnbuckle 38 to adjust the radial positioning of chill block 30 and curved outer surface 34 thereon within the interior of bolting flange 16.

Figure 5:
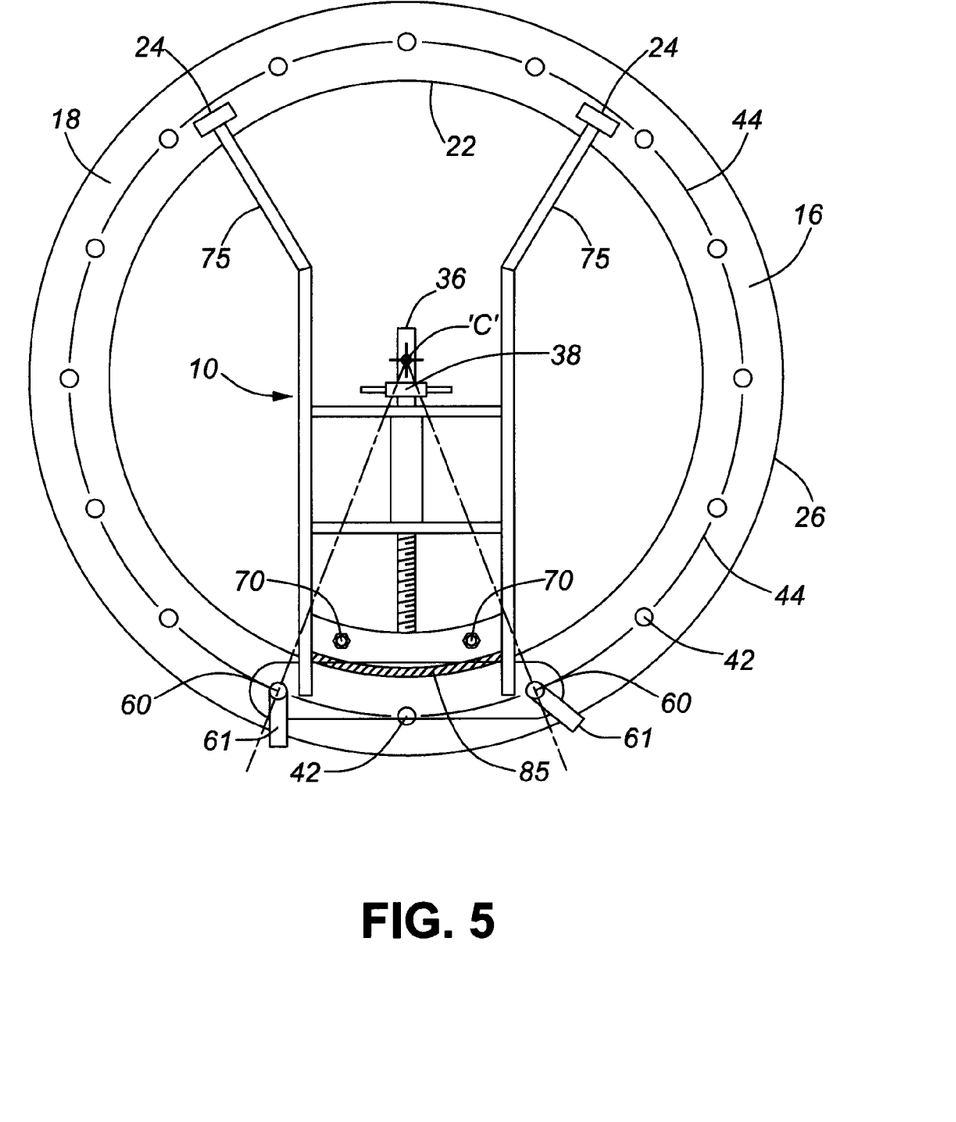
FIG. 5 is a top view of a second embodiment of the welding jig of the present invention, shown overlying a bolting flange, wherein the two spaced-apart contact points, positioned at one end of said frame member, o contact and remain in contacting engagement during welding with correspondingly spaced apart bolt holes in a circular bolt hole pattern on said bolting flange.

Because circular outer periphery 26 (in the embodiment shown in FIGS. 1-4) is perfectly concentric about center "C" of bolting flange 16, curved outer surface 34 of chill block 30 can be maintained concentric with center "C" by elongate members 50 of frame member 12 regardless of the radial position of the welding jig 10 on bolting flange 16. (eg. cf FIGS. 1 & 2). Specifically, chill block 30 is preferably centered precisely intermediate two contact points 23 (ie rollers 24) on circular outer periphery 26, and thus the center of curvature of arcuate surface 34 will precisely fall at center point "C" of pipe 18. This is because of the geometric principle that a line perpendicular to and which equally bisects a line connecting two points on the periphery of a circle need necessarily pass through the center of the circle. Elongate threaded member 36 preferably passes through center point "C", as best shown in FIGS. 3, 5, & 6, in order that arcuate surface 34 be concentric with circular outer periphery 26.

Where circular bolt hole pattern 44 on bolting flange 16 is also concentric about center point "C", and where the outer periphery 26 of bolting flange 16 may or may not be perfectly circular or not perfectly concentric about center point "C", in such circumstances an alternative embodiment and manner of operation of the welding jig 10 of the present invention is provided, as shown in FIGS. 5 & 6.

Specifically, in such embodiment where circular bolt hole pattern 44 on bolting flange 16 is concentric with center "C" of bolting flange 18, welding jig 10 as shown in FIGS. 5 & 6 is provided with a pair of spaced apart contact points at one end of jig 10 in the form of removable pin members 60, which may each be inserted in a corresponding pair of bolt holes 42 within circular bolt pattern 44. As chill block 30 is centered precisely intermediate two contact points (ie removable pin members 60) on circular outer periphery 26 as shown in FIGS. 5 & 6), chill block 30 and in particular convexly curved surface 34 thereof will be kept perfectly concentric about center "C" of bolting flange 18.

Removable pins 60 (which serve to position welding jig 10 on bolting flange 16 so that arcuate surface 34 is concentric with circular bolt hole pattern 44) are of a diameter substantially corresponding to bolt holes 42 within flange member 16, and may be provided with gripping members 61 which facilitate easy handling and prevent pins 60 from slipping through bolt holes 42.

Figure 4:
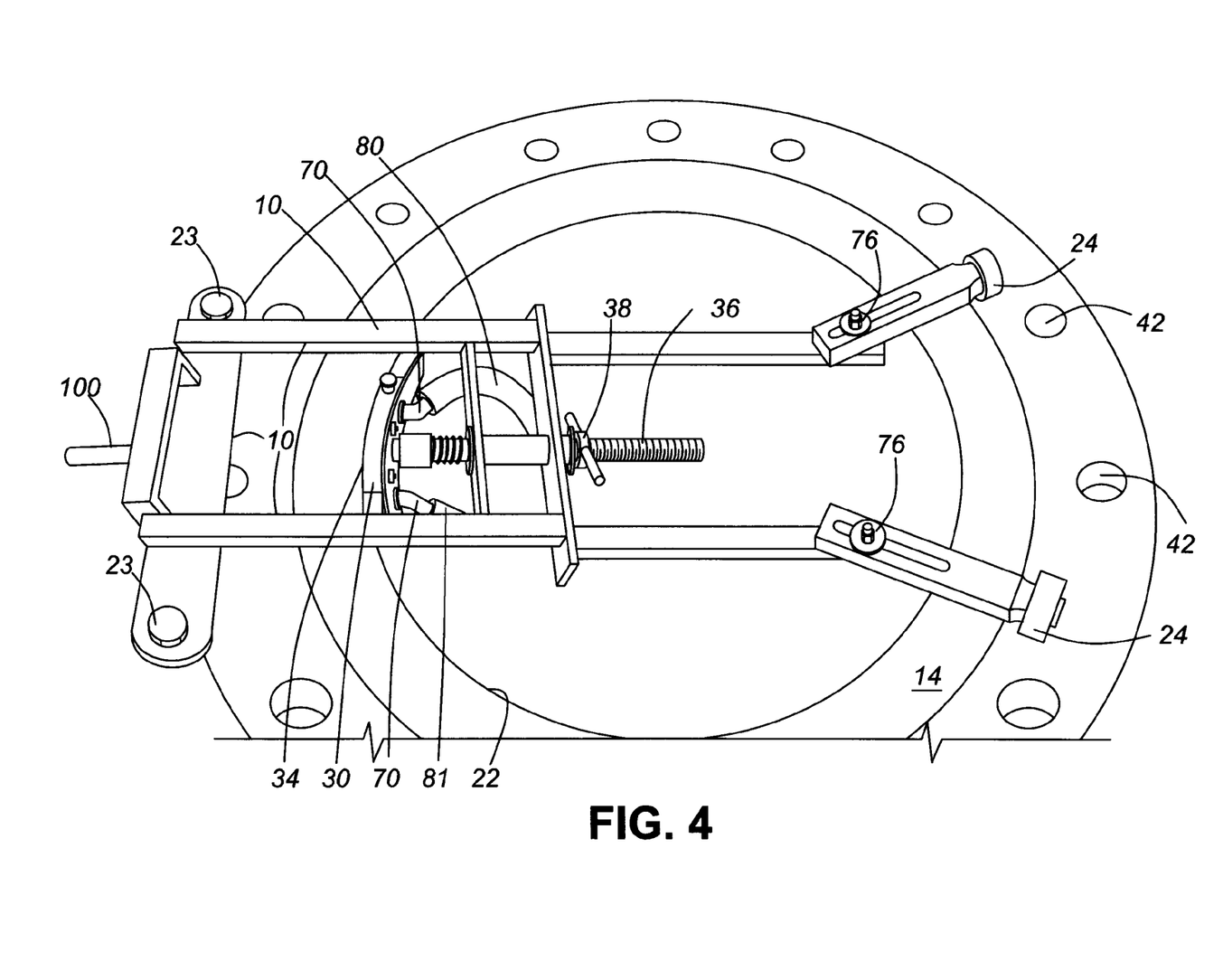
FIG. 4 is a perspective side view of a further refinement of the first embodiment of the welding jig shown in FIG. 1, having means to permit said distal end of the frame of the welding jig to overlie and be supported by said bolting flange, wherein such means comprises a pair of spaced-apart rollers which assist in the translational movement of the welding jig about the circular periphery of the flange.

In a preferred embodiment of the welding jig 10 of the present invention, at a distal end 72 thereof opposite contact points 23 possesses means to overlie and be supported by bolting flange 16. In a preferred embodiment such means comprises a pair of rollers 24 disposed on elongate arms 75, as most clearly shown in FIGS. 1,3, 4,5,& 6. In a preferred embodiment as shown in FIG. 4, adjustment means 76 such as shown in FIG. 4 may be provided on elongate arms 75 of frame 12 to allow respective adjustment of the position of rollers 24 overlying bolting flange 16.

The manner of operation of the welding jig 10 in creating a pipe 18 having a flange 16 wherein the interior surface 22 thereof is made concentric with the circular outer periphery 26 of the bolting flange 16 and/or the circular bolt hole pattern 44 on bolting flange 16 will now be described in detail.

Welding jig 10 is placed over planar face 14 of flange 16, substantially perpendicular to longitudinal axis 17 of pipe 18.

In an instance where the circular outer periphery 26 of bolting flange 16 is perfectly circular and concentric about center "C" of flange 16, a welding jig 10 as shown in FIGS. 1-4 is used, having a pair of spaced apart contact points 23 in the form of rollers 24, which are placed in contact with the circular outer periphery 26 of bolting flange 16. Arcuate curved surface 34 of chill block 30 is positioned via turnbuckle 38 on elongate threaded member 36 against the inner surface 22 of pipe 18, at a distance "R" corresponding to the desired uniform radius of inner surface 22 of pipe 18.

Cooling fluid is provided via tubing 80 to chill block 30, and removed from chill block 30 via additional tubing 81. Weld material using welding gun (typically tungsten inert gas welding gun, but other forms of welding may be used as will occur to a person of skill in the art), to uniformly deposit material (typically wear resistant material) in the interstitial distance between existing wear material on inner surface 22 of pipe 18, and the arcuate curved surface 34 of chill block 30.

Upon solidification of such deposited material on the inner surface 22 of pipe 18, welding jig 10, and in particular rollers 24 in contact with circular periphery 26, is repositioned by sliding rollers 24 along circular periphery 26, thereby moving chill block 30 and curved surface 34 thereof to a new position contacting inner surface 22 of pipe 18. Repositioning may be assisted by use of handle member 100 positioned intermediate rollers 24 proximate points of contact with circular periphery 26.

To reposition such arcuate surface 34 and welding jig, it may be necessary to unscrew turnbuckle 38, reposition welding jig 10, and rescrew turnbuckle 38 to return arcuate surface 34 of chill block 30 to the desired radial position "R".

The above welding and repositioning steps are sequentially repeated as the chill block 30 is incrementally repositioned around the inner circumference of pipe 18, until the entirety of inner surface 22 of pipe 18 has had weld material uniformly deposited thereon, thereby producing an inner surface 22 of a diameter concentric with the outer periphery 26 of bolting flange 16.

In an instance with regard to a bolting flange 16 on a pipe 18 has a circular bolt hole pattern 44 perfectly circular and concentric within center "C" of pipe 18, and particularly in a situation where outer periphery 26 of bolting flange 16 is not perfectly circular and/or not concentric with center "C" of pipe 18, a welding jig of slightly modified configuration is used, namely of a configuration as shown in FIGS. 5 &6.

Specifically, in such situation, welding jig 10 is provided with two contact points in the form of insertable pins 60, apertures for such pins 60 being provided a predetermined distance apart in frame 12 corresponding to the shortest distance between a predetermined number of bolt holes 42 on bolting flange 16. Jig 10 is placed over planar face 14 of bolting flange 16, and pins 60 inserted within a pair of bolt holes 42 within circular bolt hole pattern 44, to thereby stabilize and temporarily secure jig 10 to bolting face 16 of pipe 18. Curved surface 34 of chill block 30 is positioned at a desired radial distance "R" (the desired uniform and concentric radius of pipe 18 which is desired to be created) via turnbuckle 38 on elongate threaded member 36.

An identical procedure identical to the process described above in respect of the alternative embodiment of the welding jig 10 is then carried out, namely a cooling fluid is supplied to the chill block 30, and a weld material 85 is built up by weld deposition in the interstitial area between the inner surface 22 of pipe 18 and the arcuate curved surface 34. Upon solidification of any weld material, pins 60 are then raised, and the welding jig repositioned by an incremental rotation about center point "C", which repositioning may be assisted by use of handle member 100.

Again, it may be necessary to unscrew turnbuckle 38, reposition welding jig 10, and rescrew turnbuckle 38 to return arcuate surface 34 of chill block 30 to the desired radial position "R".

Many variations and modifications will now occur to those skilled in the art.

For a complete definition of the invention and its intended scope, reference is to be made to the summary of the invention and the appended claims read together with and considered with the disclosure and drawings herein.

I claim:

1. A welding jig capable of ensuring concentricity of an interior surface of a cylindrical pipe with (i) a circular outer periphery of a bolting flange; or (ii) a circular bolt hole pattern in said bolting flange; said welding jig comprising:
   (a) an elongate frame member, having a longitudinal axis capable of overlying a substantially planar face of said bolting flange, in a position substantially perpendicular to a longitudinal axis of said pipe, said elongate frame member comprising:
   (i) at least two spaced-apart contact points, positioned at one end of said elongate frame member, said contact points capable of contacting and during welding remaining in contacting engagement with said circular outer periphery of said bolting flange or said bolt hole pattern on said bolting flange;
   (b) a chill block, situated on said frame member between said contact points but spaced therefrom, comprising:
   (i) a convexly-curved outer surface, having a curvature corresponding to a desired inner diameter of said pipe and a center of curvature thereof lying on a first line bisecting and extending perpendicular to a second line extending between said two spaced-apart contact points, said convexly-curved outer surface positionable proximate said interior surface of said pipe when said frame member overlies said bolting flange, wherein said chill block is coupled to an elongate member aligned along said first line which allows said convexly-curved outer surface to be concentric with said circular outer periphery of said bolting flange or said circular bolt hole pattern in said bolting flange; and
   (ii) fluid inlet and outlet means for allowing cooling fluid to circulate therewithin for cooling said convexly-curved circular outer surface thereof;
   wherein said frame member, when said contact points thereon contact said circular outer periphery of said bolting flange or at least two bolt holes in said circular bolt hole pattern, maintains said curved outer surface of said chill block concentric with said circular outer periphery of said bolting flange or said bolt hole pattern during welding of material on said inner surface of said pipe.

2. A welding jig capable of ensuring concentric weld deposition of material on an interior diameter of a pipe flange, comprising:

elongate frame means, having a longitudinal axis capable of being positioned over a planar bolting face of said pipe flange, in a position substantially perpendicular to a longitudinal axis of said pipe;

at least two spaced-apart contact points, located at one end of said elongate frame means, capable of contacting and remaining in contacting engagement during welding with said circular outer periphery of said bolting flange on said pipe;

a chill block, mounted on said frame means a spaced distance from said contact points, having a convexly curved outer surface of a curvature corresponding to a desired inner diameter of said pipe flange and a center of said curvature lying on a first line bisecting and extending perpendicular to a second line extending between said two spaced-apart contact points, wherein said chill block is coupled to an elongate member aligned along said first line which allows said convexly-curved outer surface to be concentric with (i) said circular outer periphery of said bolting flange or (ii) said circular bolt hole pattern in said bolting flange; and wherein said frame means and contact points allow translational movement of said chill block about said center of curvature to permit uniform deposition of weld material on said inner diameter of said pipe flange around an entire inner periphery of said pipe flange.

3. The welding jig as claimed in claim 1 or 2, wherein said contact points each respectively comprise roller means, said rollers means capable of contacting said circular outer periphery of said bolting flange and permitting translational movement of said welding jig about said circular outer periphery of said bolting flange.

4. The welding jig as claimed in claim 1, 2, or 3, wherein said frame member, at a distal end thereof opposite said contact points, possesses means to permit said distal end to overlie and be supported by said bolting flange.

5. The welding jig as claimed in claim 4, wherein means at said distal end to overlie said bolting flange comprises a pair of spaced-apart roller means.

6. The welding jig as claimed in claim 1, further comprising:

sliding roller means positioned at an end of said frame member opposite said two spaced-apart contact points.

7. The welding jig as claimed in claim 2, further comprising:

sliding roller means positioned at an end of said frame member opposite said two spaced-apart contact points; and said chill block coupled to an elongate threaded member and a turnbuckle which together allow adjustment of the radial positioning of said convexly-curved outer surface.

8. A welding jig for ensuring concentricity of an interior surface of a cylindrical pipe, wherein said interior surface is comprised of a plurality of elongate wear rods welded side by side in juxtaposed parallel relationship to each other, with: (i) a circular outer periphery of a bolting flange or (ii) a circular bolt hole pattern in said bolting flange; said welding jig comprising:

(a) an elongate frame member, having a longitudinal axis capable of being positioned over planar face of said bolting flange in a position substantially perpendicular to a longitudinal axis of said pipe, said elongate frame member comprising:
 (i) two spaced-apart contact points, positioned at of one end of said frame member, said contact points capable of contacting and during welding remaining in contacting engagement with said circular outer periphery of said bolting flange or said bolt hole pattern in said bolting flange;
 (ii) at an opposite end thereof bolting flange contact means;

(b) a chill block, situated on said frame member between said contact points but spaced therefrom and located between said one end and said opposite end of said frame member, comprising:
 (i) a convexly-curved outer surface of a curvature corresponding to a desired inner diameter of said pipe, a center of curvature thereof lying on a first line bisecting and extending perpendicular to a second line extending between said two spaced-apart contact points wherein said chill block is coupled to an elongate member aligned along said first line which allows said convexly-curved outer surface to be concentric with said circular outer periphery of said bolting flange or said circular bolt hole pattern in said bolting flange; and
 (ii) fluid inlet and outlet means for allowing cooling fluid to circulate therewithin for cooling said convexly-curved circular outer surface thereof;

wherein said frame member, when said contact points thereon contact said circular outer periphery of said bolting flange or at least two bolt holes in said circular bolt hole pattern, maintains said curved outer surface of said chill block concentric with said circular outer periphery of said bolting flange or said bolt hole pattern during welding of material on said inner surface of said pipe.

9. The welding jig as claimed in claim 8, further comprising:

sliding roller means positioned at said opposite end of said frame member.

10. The welding jig as claimed in claim 8, further comprising:

sliding roller means positioned at said opposite end of said frame member; and said chill block coupled to an elongate threaded member and a turnbuckle which together allow adjustment of the radial positioning of said convexly-curved outer surface.

* * * * *